United States Patent
Wu (10) Patent No.: US 8,264,979 B2
(45) Date of Patent: Sep. 11, 2012

(54) METHOD OF TRANSMITTING RADIO ACCESS CAPABILITY IN A WIRELESS COMMUNICATIONS SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 354 days.

(21) Appl. No.: 12/610,368

(22) Filed: Nov. 2, 2009

(65) Prior Publication Data

US 2010/0130217 A1 May 27, 2010

Related U.S. Application Data

(60) Provisional application No. 61/117,961, filed on Nov. 26, 2008.

(51) Int. Cl.
*G01R 31/08* (2006.01)
(52) U.S. Cl. ......................... 370/252; 455/450
(58) Field of Classification Search .................. 455/450; 370/252, 329
See application file for complete search history.

(56) References Cited

U.S. PATENT DOCUMENTS

| | | | |
|---|---|---|---|
| 2005/0075074 A1 | 4/2005 | Benson | |
| 2005/0271008 A1 | 12/2005 | Gallagher | |
| 2005/0272449 A1* | 12/2005 | Gallagher et al. | 455/458 |
| 2007/0224990 A1* | 9/2007 | Edge et al. | 455/436 |
| 2011/0244865 A1* | 10/2011 | Wu et al. | 455/436 |

FOREIGN PATENT DOCUMENTS

CN 101060695 A 10/2007

OTHER PUBLICATIONS

3GPP TS 44.018 V8.40 (Sep. 2008).*
3GPP, 3GPP TS 36.331 V8.3.0 Evolved Universal Terrestrial Radio Access (E-UTRA) Radio Resource Control (RRC), Sep. 2008.
3GPP, 3GPP TS 44.018 V8.4.0 Mobile radio interface layer 3 specification;Radio Resource Control (RRC) protocol, Sep. 2008.
Office action mailed on Oct. 24, 2011 for the European application No. 09 014 462.7, filing date Nov. 19, 2009, cover page+ p. 1-4.
Vodafone, "UE capability handling in LTE/SAE", 3GPP TSG-SA 2 Meeting #65/64b, S2-083717, May 7-16, 2008 Munich and Prague, XP050265914, p. 1-2.
3GPP TS 25.331 V7.10.0 (Sep. 2008), "3rd Generation Partnership Project; Technical Specification Group Radio Access Network; Radio Resource Control (RRC); Protocol Specification (Release 7)", XP050368013, p. 98-104 and p. 525-527.
Office action mailed on Jul. 26, 2011 for the China application No. 200910225104.1, filing date Nov. 26, 2009, p. 1-5.

* cited by examiner

*Primary Examiner* — Sai-Ming Chan
(74) *Attorney, Agent, or Firm* — Winston Hsu; Scott Margo (57) ABSTRACT

A method of transmitting radio access capability for a mobile device in a first wireless communication system includes including capability information of the mobile device, corresponding to a second wireless communication system, in a radio resource message, and sending the radio resource message to a network of the second wireless communication system.

18 Claims, 6 Drawing Sheets

| IEI | Information element | Type / Reference | Presence | Format | Length (1 byte) |
|---|---|---|---|---|---|
| | RR management Protocol Discriminator | Protocol Discriminator | M(Mandatory) | V(Value only) | 1/2 |
| | Skip Indicator | Skip Indicator | M | V | 1/2 |
| | EUTRAN Classmark Change Message Type | Message Type | M | V | 1 |
| | EUTRAN Classmark | EUTRAN Classmark | M | LV(Length and value) | |

METHOD OF TRANSMITTING RADIO ACCESS CAPABILITY IN A WIRELESS COMMUNICATIONS SYSTEM AND RELATED COMMUNICATION DEVICE

CROSS REFERENCE TO RELATED APPLICATIONS

This application claims the benefit of U.S. Provisional Application No. 61/117,961, filed on Nov. 26, 2008 and entitled "METHOD OF TRANSMITTING EUTRA CAPABILITY IN A WIRELESS COMMUNICATIONS SYSTEM AND RELATED COMMUNICATION DEVICE" the contents of which are incorporated herein.

BACKGROUND OF THE INVENTION

1. Field of the Invention

The present invention relates to a method and related communication device used in a wireless communication system and more particularly, to a method for transfer capability information related to an evolved third generation wireless communications system in a second generation wireless communications system and related communication device.

2. Description of the Prior Art

Global system for mobile communication (GSM) is a globally accepted second generation (2G) standard for digital cellular communication. A GSM network includes a switching system (SS), a base station system (BSS), and an operation and support system (OSS). A mobile switching center, part of the SS, performs the telephony switching functions of the system, e.g. an inter-RAT (Radio Access Technology) handover. The BSS handles a radio interface to a mobile station (MS) and provides physical links and related control functions with the MSC.

With evolution of the telecommunication system, a long term evolution system is developed as an evolved third generation (3G) standard to provide a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of user equipments (UEs).

Due to demand for a multi-mode device, the MS can support the LTE system in addition to the GSM system, and is stored with capability information of each supported system. The capability information mainly associates with abilities of link establishment, measurement, frequency tuning, etc. When the MS operates in the GSM system, the GSM network can initiate an inter-RAT to the E-UTRAN for the MS. The GSM network and the E-UTRAN need to know how much EUTRA capability (the capability associates with the LTE system) the MS has, so as to generate a handover message for configuring the MS during the inter-RAT. With handover configuration appropriately set based on the EUTRA capability information, the MS is able to successfully connect the E-UTRAN; otherwise the inter-RAT is failed.

However, the prior art does not provide a way for the MS in the GSM system to transmit the EUTRA capability information to the GSM network responsible for transferring the MS capabilities to the E-UTRAN. Without the EUTRA capability information, the GSM network cannot arrange Inter-RAT handover to EUTRAN for the UE. Then the UE cannot get higher-QoS (Quality of Service) service provided by the E-UTRAN even if the UE is under EUTRAN coverage.

SUMMARY OF THE INVENTION

Therefore, the present invention provides a method of transmitting radio access capability associated with the evolved 3G system in a 2G wireless communication system and related communication device.

According to one aspect of the present invention, a method of transmitting radio access capability for a mobile device in a second generation wireless communication system includes including capability information of the mobile device, corresponding to an evolved third generation wireless communication system, in a radio resource message, and sending the radio resource message to a network of the second generation wireless communication system.

According to another aspect of the present invention, a communication device of a second generation wireless communication system for accurately transmitting radio access capability includes a computer readable recording medium and a processor. The computer readable recording medium is used for storing program code corresponding to a process and capability information corresponding to an evolved third generation wireless communication system. The processor is coupled to the computer readable recording medium and used for processing the program code to execute the process. The process includes including the capability information in a radio resource message, and sending the radio resource message to a network of the second generation wireless communication system.

These and other objectives of the present invention will no doubt become obvious to those of ordinary skill in the art after reading the following detailed description of the example that is illustrated in the various figures and drawings.

DETAILED DESCRIPTION

Figure 1:
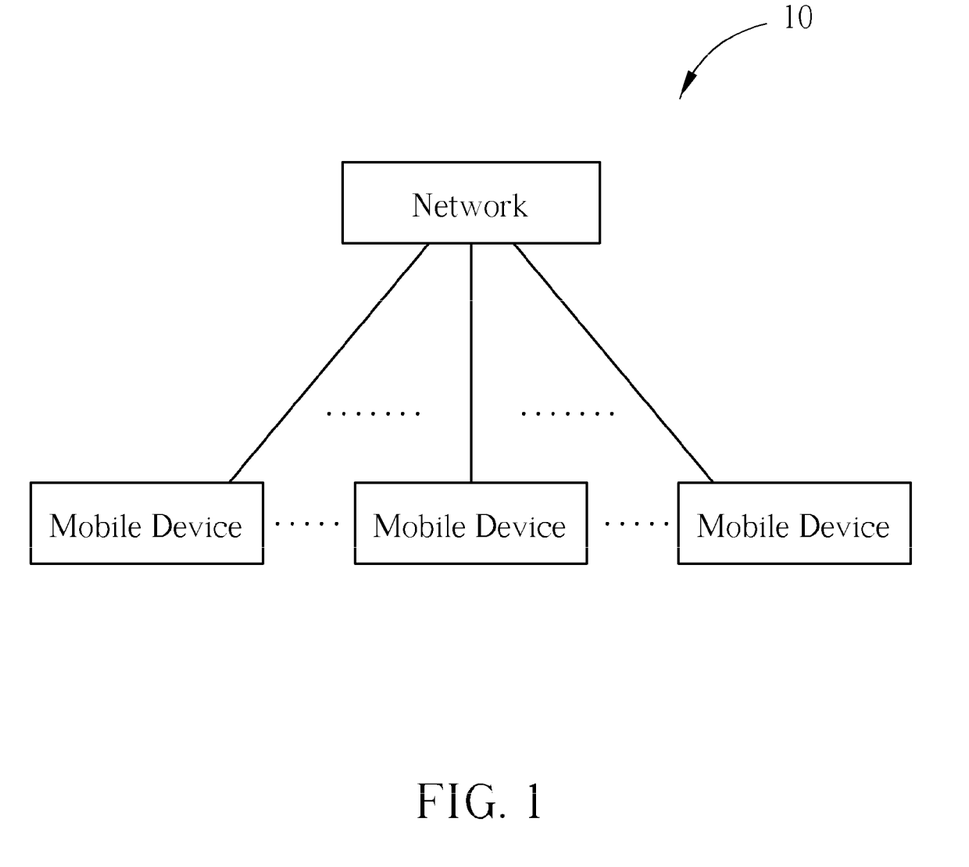
FIG. 1 is a schematic diagram of a wireless communication system.

Please refer to FIG. 1, which illustrates a schematic diagram of a wireless communication system 10 according to an example of the present invention. Briefly, the wireless communication system 10 includes a network and a plurality of mobile devices. In FIG. 1, the network and the mobile devices are simply utilized for illustrating the structure of the wireless communication system 10. The wireless communication system 10 may be a second generation (2G) wireless communication system, e.g. Global System for Mobile (GSM) communications system. In the GSM system, the network is referred as a GERAN (GSM/EDEG Radio Access Network) comprising a plurality of base stations, whereas the mobile devices are referred as mobile stations (MSs). The MSs can be devices such as mobile phones, computer systems, etc. Besides, the network and the MS can be seen as a transmitter or receiver according to transmission direction, e.g., for uplink (UL), the MS is the transmitter and the network is the receiver, and for downlink (DL), the network is the transmitter and the MS is the receiver.

Figure 2:
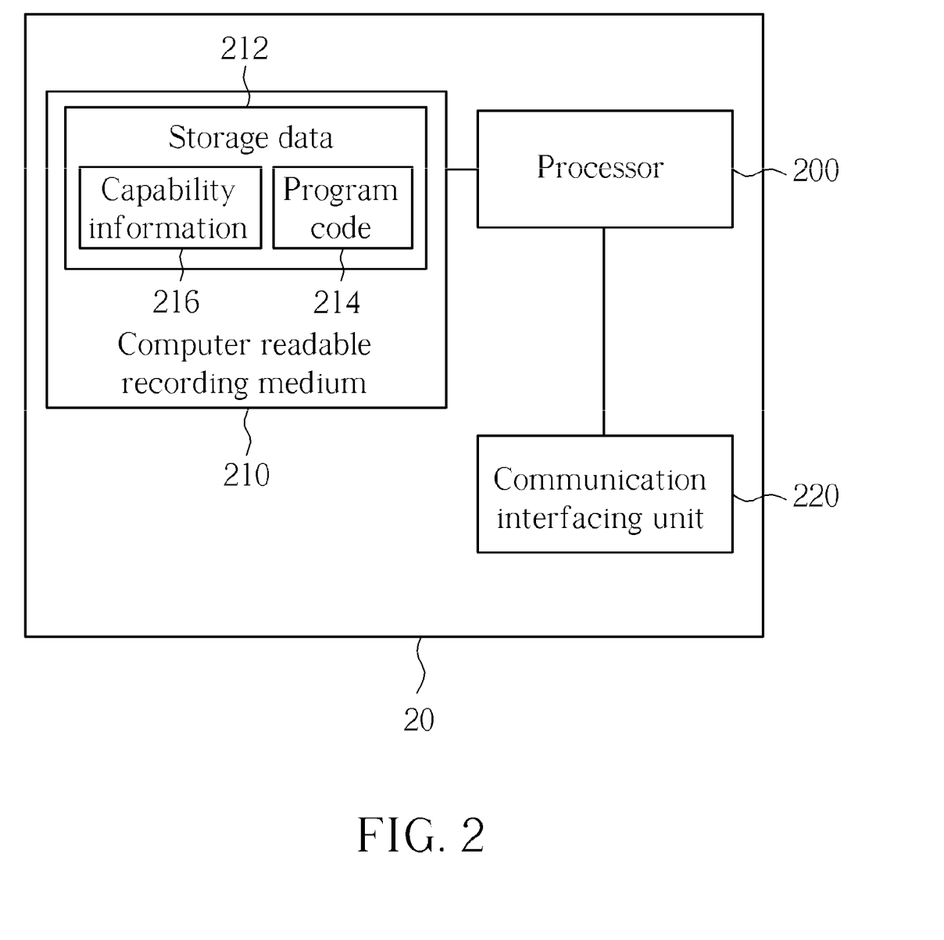
FIG. 2 is a schematic diagram of a communication device according to an example of the present invention.

Please refer to FIG. 2, which illustrates a schematic diagram of a communication device 20 according to an example of the present invention. The communication device 20 can be the mobile devices shown in FIG. 1 and includes a processor 200, a computer readable recording medium 210 and a communication interfacing unit 220. The computer readable recording medium 210 is any data storage device that includes program code 214 and capability information 216, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver and accordingly exchanges wireless signals with the network. The capability information 216 reveals operating capability of the communication device 20 for an evolved third generation (3G) wireless communication system, e.g. a long term evolution (LTE) system.

Figure 3:
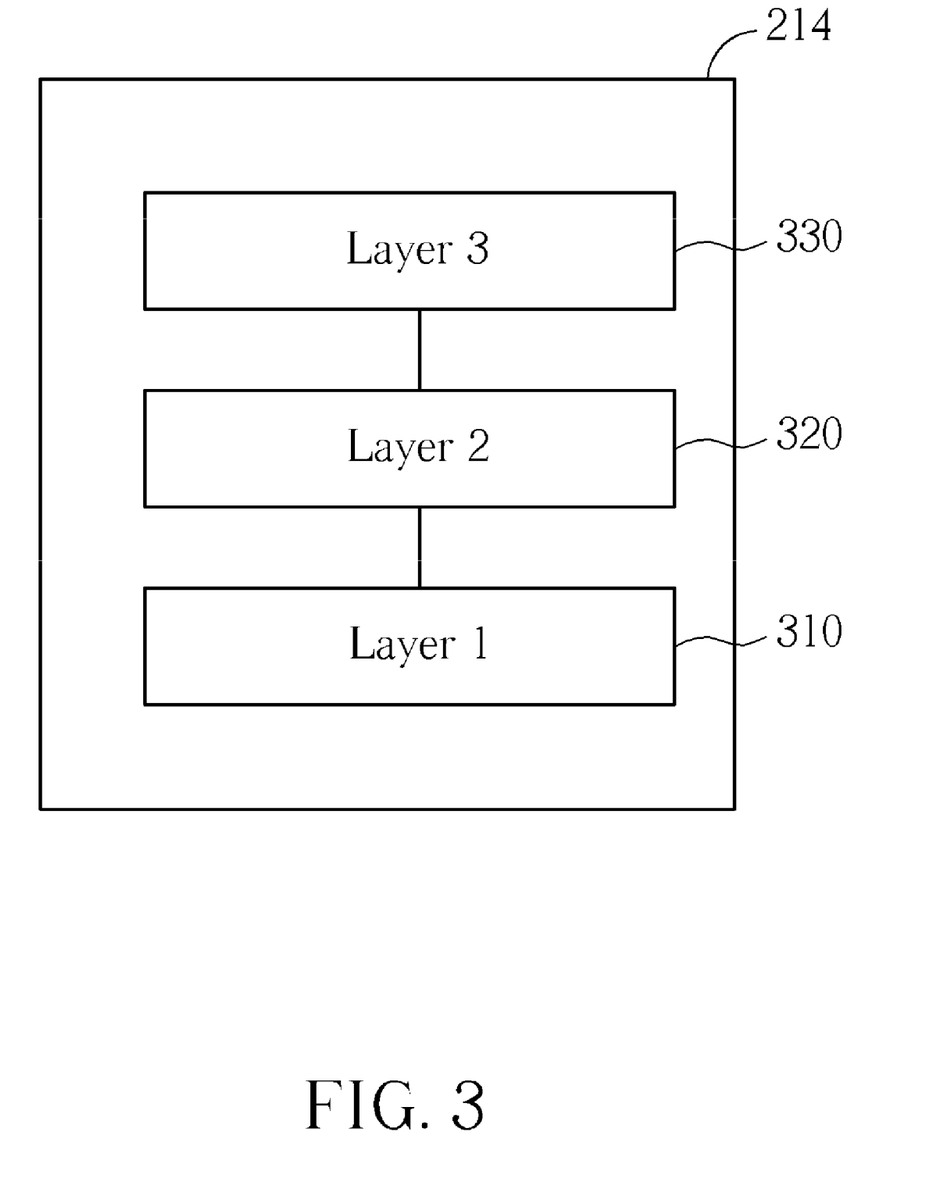
FIG. 3 is a schematic diagram of the program code for the GSM system according to an example of the present invention.

Please refer to FIG. 3, which illustrates a schematic diagram of the program code 214 for the GSM system according to an example of the present invention. The program code 214 includes program code of multiple communications protocol layers, which from top to bottom is program code of a Layer 1 310, a Layer 2 320 and a Layer 3 330. The Layer 1 310 is a physical layer, which can cooperate with the communication interfacing unit 220 to use the air interface channels. The Layer 2 320 is a data-link layer, a link access protocol on the Dm channel (LAP-Dm), for realizing a radio link between the MS and the network. The Layer 3 330 includes a RR (Radio Resource) management sublayer utilizing RR massages and information elements (IEs) to transmit signaling information, e.g. handover information and RAT capability information, for managing the radio/physical link.

Figure 4:
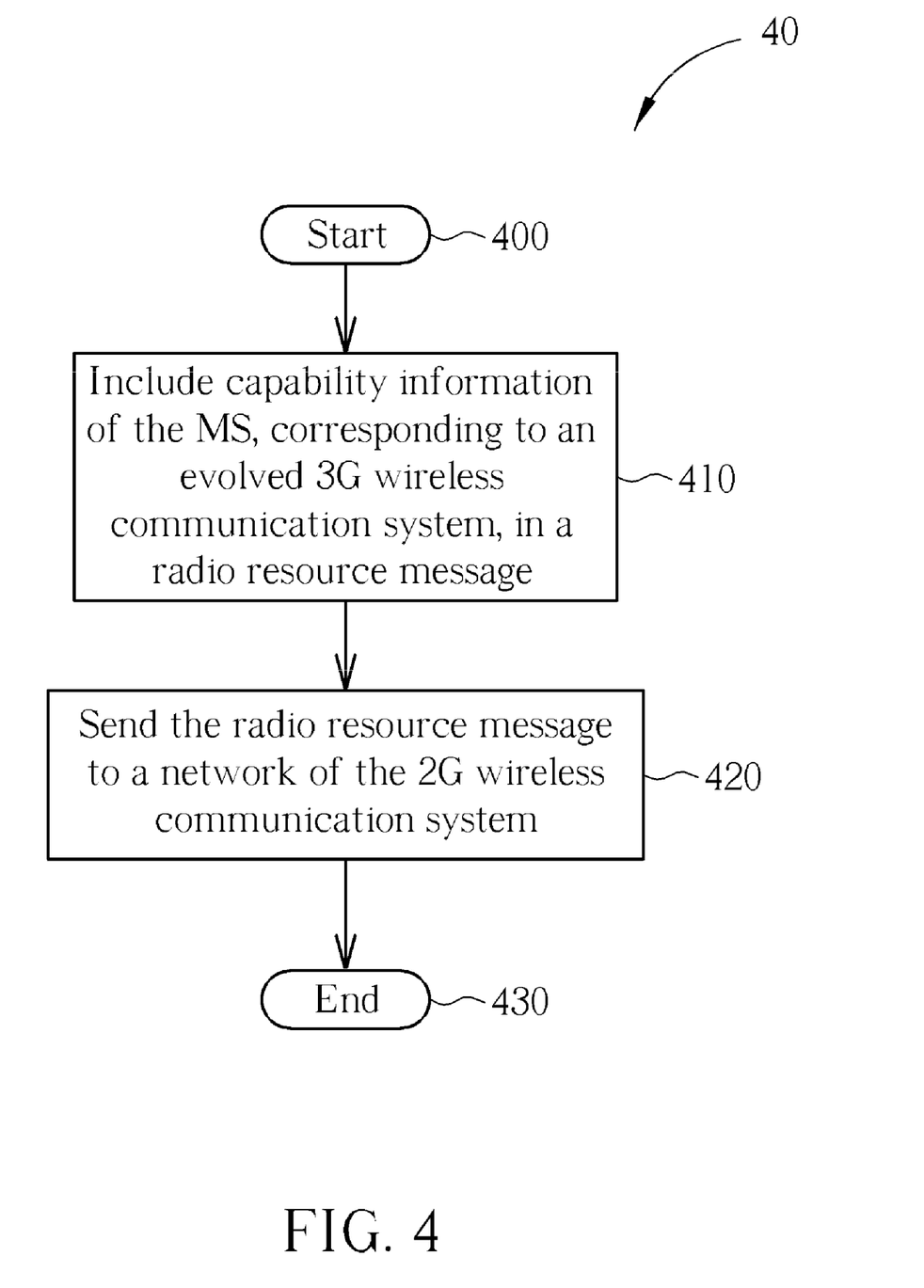
FIG. 4 is a flowchart of a process according to an example of the present invention.

Please refer to FIG. 4, which illustrates a flowchart of a process 40 according to an example of the present invention. The process 40 is utilized for transmitting radio access capability for a MS in a 2G wireless communication system. The process 40 can be compiled into the program code 214 and includes the following steps:

Step 400: Start.

Step 410: Include capability information of the MS, corresponding to an evolved 3G wireless communication system, in a radio resource message.

Step 420: Send the radio resource message to a network of the 2G wireless communication system.

Step 420: End.

According to the process 40, the MS includes the evolved 3G capability information (e.g. the capability information 216) in the radio resource message and informs the capability to the 2G network by sending the radio resource message. The capability information is preferably interpretable by a radio resource control (RRC) layer of the evolved third generation wireless communication system. Furthermore, the MS can re-send the radio resource message to the 2G network when the evolved 3G capability changes. Through the process 40, the 2G network with the evolved 3G capability information is able to accurately prepare an inter-RAT (Radio Access Technology) handover to the evolved 3G system so that the MS can access better services from the evolved 3G network. For example, the 2G network transfers the evolved 3G capability information of the MS to the target evolved 3G network before the inter-RAT handover, and according to the evolved 3G capability information, the target 3G network can thereby generate an appropriately-configured handover message.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the process 40 and the processed results transfer the communication device 20 to a state of being able to successfully access the target wireless communication that has obtained sufficient capability information from the communication device 20.

Figure 5:
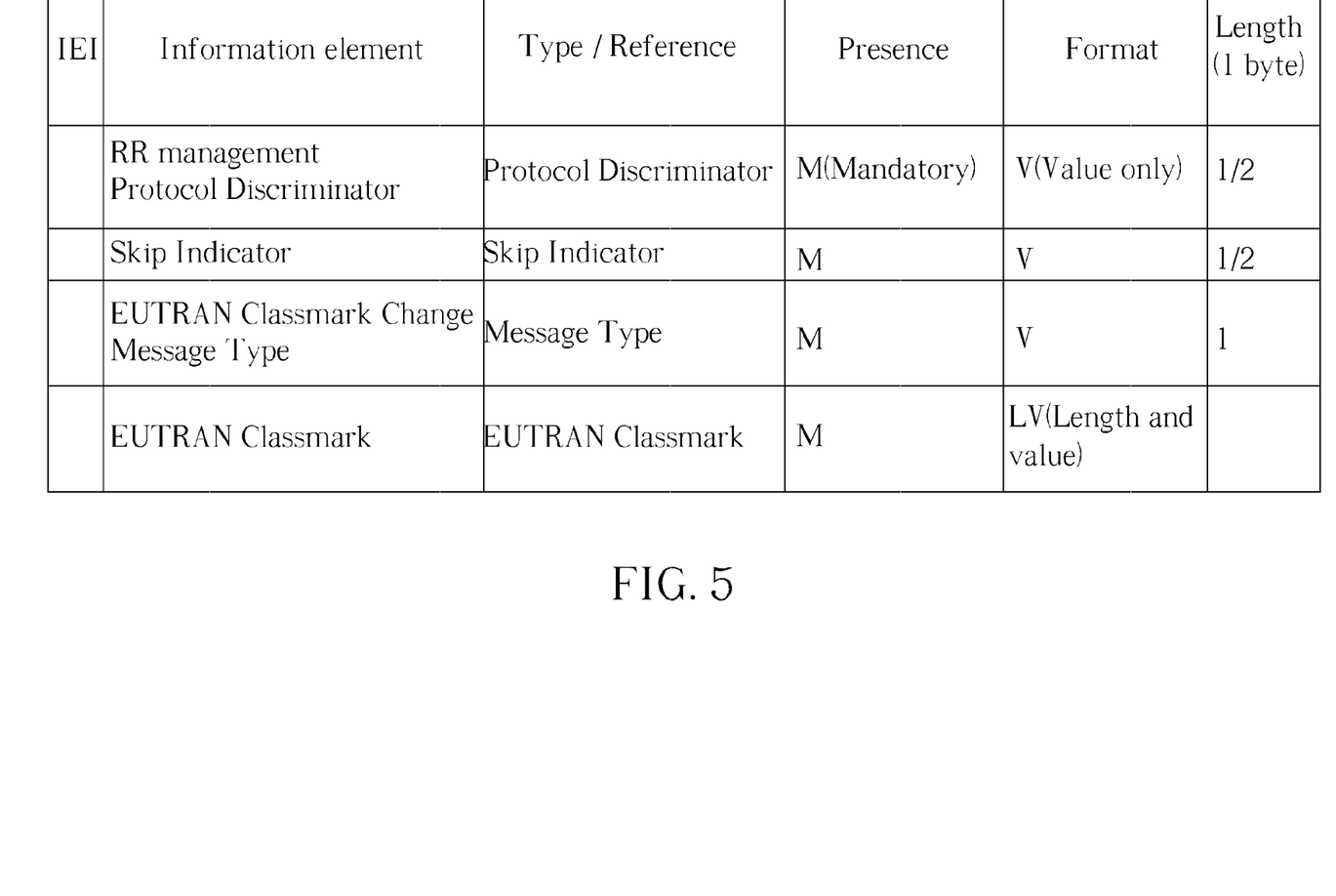
FIG. 5 is a schematic diagram of radio resource message content according to an example of the present invention.

For a MS supporting GSM and LTE systems, the GSM RR (Radio Resource) message is a transfer means for EUTRA (Evolved UMTS Terrestrial Radio Access) capability information. Please refer to FIG. 5, which is a schematic diagram of message content of the GSM RR message. The radio resource message includes "RR management protocol discriminator", "skip indicator", "EUTRAN Classmark Change message type", and "EUTRAN Classmark" IEs. An IEI (Information Element Identifier) field is used for identifying the abovementioned IEs and each can be set to predetermined values known by both the ME and the 2G network. The "skip indicator" IE represented by 4 bits is utilized to encode an identification data value corresponding to a target E-UTRAN (Evolved UMTS Terrestrial Radio Access Network). The skip indicator different from 0000 indicates that the radio resource message shall be ignored. The skip indicator IE encoded as 0000 indicates that the radio resource message shall not be ignored. The "RR management protocol discriminator" IE is utilized to identify the Layer 3 protocol to which the RR message belongs. The correspondence between L3 protocols and protocol discriminators is one-to-one. The message type is utilized to identify the purpose and structure of the RR message. The "EUTRAN Classmark Change message type" IE includes a predetermined value identifiable by GSM network. The predetermined value can be "01100110". The "EUTRAN Classmark" IE includes EUTRA capability information.

Figure 6:
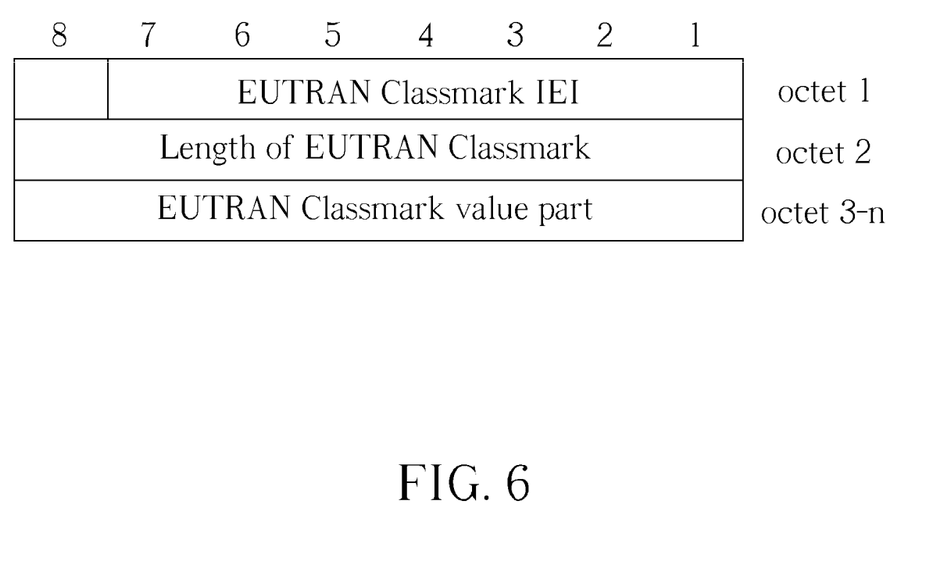
FIG. 6 is a schematic diagram of information element content according to an example of the present invention.

Please refer to FIG. 6, which is a schematic diagram of content of the "EUTRAN Classmark" IE. The "EUTRAN Classmark" IE includes an IEI field, a length field and a value part. The length field is represented by an octet. The value part of the "EUTRAN Classmark" IE is EUTRA capability information.

The EUTRA capability information can include at least one of an access stratum release parameter, a UE (User Equipment) category parameter, packet data convergence protocol (Packet Data Convergence Protocol) parameters, physical layer parameters, radio frequency (RF) parameters and measurement parameters. The access stratum release parameter relates to a release of Layers 1, 2, and 3. The UE category parameter is used to define a combined uplink and downlink capability, such as maximum numbers of a downlink/uplink transport block bits received within a TTI (transmission time interval), and a total buffer size of the Layer 2. The physical layer parameter relates to configuration of uplink closed-loop antenna selection transmit diversity and downlink reference signals. The RF parameter defines which E-UTRA radio frequency bands are supported by the MS. The measurement parameter defines for each supported E-UTRA band whether measurement gaps are required to perform measurements on each other supported E-UTRA radio frequency band and on each supported band combination.

Alternatively, the EUTRA capability information is essentially generated based on a "UE-EUTRA-Capability" IE used in a RRC layer of the LTE system, where interRAT parameters of the EUTRA capability information are optional. The GSM RR message can directly include the EUTRA capability information without the "EUTRAN Classmark" IE.

The MS can send the radio resource message to the 2G network through an early classmark sending procedure. In the early classmark sending procedure, the MS sends the radio resource message including the evolved 3G capability to the 2G network if the 2G network indicates in system information supporting early classmark sending. Besides, the 2G network can ask for capability of the MS by sending a CLASSMARK ENQUIRY message including a "Classmark Enquiry Mask" IE whose 5th to 7th bits have a predetermined value of "001" or a predetermined value other than "000" and "111". The "000" and "111" values associates with a UMTS system classmark change. The MS sends the radio resource message including the evolved 3G capability to the 2G network in respond to the CLASSMARK ENQUIRY message.

In conclusion, the examples of the present invention mainly provide the method/means for transferring device capability associated with a wireless system to another wireless system, particularly for transmitting the evolved 3G capability to the 2G network by a RR message of the 2G RAT so that the 2G network can appropriately prepare an interRAT handover to the evolved 3G system based on the received evolved 3G capability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting radio access capability for a mobile device in a first wireless communication system, the method comprising:
    including capability information of the mobile device, corresponding to a second wireless communication system, in a radio resource message; and
    sending the radio resource message to a network of the first wireless communication system;
    wherein the capability information includes at least one of a parameter for an access stratum release, a category parameter, parameters of a packet data convergence protocol, parameters of a physical layer, radio frequency parameters and measurement parameters; and the radio resource message includes a protocol discriminator information element, a skip indicator information element, a classmark change message type information element related to the second wireless communication system, and a classmark information element related to the second wireless communication system, wherein the classmark information element includes the capability information.

2. The method of claim 1, wherein the classmark change message type information element has a predetermined value of "01100110".

3. The method of claim 1, wherein the first wireless communication system is a second generation, also called 2G, wireless communication system, and the second wireless communication system is an evolved third generation wireless communication system.

4. The method of claim 1, wherein the capability information is interpretable by a radio resource control layer of the second wireless communication system.

5. The method of claim 1, wherein the capability information includes a "UE-EUTRA-Capability" information element.

6. The method of claim 1, wherein sending the radio resource message to a network of the first wireless communication system comprises sending the radio resource message to the network through an early classmark sending procedure.

7. The method of claim 6, wherein sending the radio resource message to the network through an early classmark sending procedure comprises:
    receiving a CLASSMARK ENQUIRY message of the early classmark sending procedure; and
    sending the radio resource message to the network in respond to the CLASSMARK ENQUIRY message.

8. The method of claim 7, wherein the CLASSMARK ENQUIRY message includes a Classmark Enquiry Mask information element whose fifth to seventh bits have a predetermined value of "001" or a predetermined value other than "000" and "111".

9. The method of claim 1 further comprising re-sending the radio resource message to the network when capability of the mobile device corresponding to the second wireless communication system changes.

10. A communication device of a first wireless communication system for accurately transmitting radio access capability, the communication device comprising:
    means for including the capability information in a radio resource message; and
    means for sending the radio resource message to a network of the first wireless communication system;
    wherein the capability information includes at least one of a parameter for an access stratum release, a category parameter, parameters of a packet data convergence protocol, parameters of a physical layer, radio frequency parameters and measurement parameters; and the radio resource message includes a protocol discriminator information element, a skip indicator information element, a classmark change message type information element related to the second wireless communication system, and a classmark information element related to the second wireless communication system, wherein the classmark information element includes the capability information.

11. The communication device of claim 10, wherein the classmark change message type information element has a predetermined value of "01100110".

12. The communication device of claim 10, wherein the first wireless communication system is a second generation, also called 2G, wireless communication system, and the second wireless communication system is an evolved third generation wireless communication system.

13. The communication device of claim 10, wherein the capability information is interpretable by a radio resource control layer of the second wireless communication system.

14. The communication device of claim 10, wherein the capability information includes a "UE-EUTRA-Capability" information element.

15. The communication device of claim 10, wherein the means for sending the radio resource message to the network of the first wireless communication system sends the radio resource message to the network through an early classmark sending procedure.

16. The communication device of claim 15, wherein the means for sending the radio resource message to the network through an early classmark sending procedure receives a CLASSMARK ENQUIRY message of the early classmark sending procedure and sends the radio resource message to the network in respond to the CLASSMARK ENQUIRY message.

17. The communication device of claim 16, wherein the CLASSMARK ENQUIRY message includes a Classmark Enquiry Mask information element whose fifth to seventh bits have a predetermined value of "001" or a predetermined value other than "000" and "111".

18. The communication device of claim 10 further comprising means for re-sending the radio resource message to the network when capability of the communication device corresponding to the second wireless communication system changes.

* * * * *